United States Patent
Shaw et al.

(10) Patent No.: US 9,244,592 B2
(45) Date of Patent: Jan. 26, 2016

(54) USER INTERFACE COALESCING HEURISTICS

(71) Applicant: Microsoft Technology Licensing, LLC, Redmond, WA (US)

(72) Inventors: Han-Yi Shaw, Redmond, WA (US); Allen Ussher, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 13/920,679

(22) Filed: Jun. 18, 2013

(65) Prior Publication Data
US 2014/0372899 A1   Dec. 18, 2014

(51) Int. Cl.
   G06F 3/00     (2006.01)
   G06F 3/0482   (2013.01)
   G06F 9/44     (2006.01)

(52) U.S. Cl.
   CPC .............. G06F 3/0482 (2013.01); G06F 9/443 (2013.01)

(58) Field of Classification Search
   CPC ..................... G06F 3/04886; G06F 2200/1614
   USPC ......................................................... 715/744
   See application file for complete search history.

(56) References Cited

U.S. PATENT DOCUMENTS

| | | | |
|---|---|---|---|
| 2004/0070627 A1 | 4/2004 | Shahine et al. | |
| 2006/0036965 A1* | 2/2006 | Harris et al. | 715/777 |
| 2007/0106950 A1* | 5/2007 | Hutchinson et al. | 715/761 |
| 2009/0172531 A1* | 7/2009 | Chen et al. | 715/702 |
| 2009/0217192 A1* | 8/2009 | Dean et al. | 715/777 |
| 2011/0041092 A1* | 2/2011 | Zhang | 715/777 |
| 2011/0252381 A1* | 10/2011 | Chaudhri | 715/838 |
| 2011/0296346 A1* | 12/2011 | Chen et al. | 715/811 |

OTHER PUBLICATIONS

Microsoft Word 2007, Screenshots of Ribbon in "Restore" and "Maximize" window sizes, Jan. 30, 2007, pp. 1-2, XP055140870, Retrieved from the Internet: URL:http://localhost/Desktop/MSWord_2007_Ribbons_depending_on_window_size.pdf. (Submitted in IDS dated Nov. 10, 2014).*
International Search Report and Written Opinion for Application No. PCT/US2014/041003 mailed Sep. 26, 2014.
Microsoft Word 2007, Screenshots of Ribbon in "Restore" and "Maximize" window sizes, http://localhost/Desktop/MS-Word_2007_Ribbons_depending_on_window_size_.pdf, 2 pages (Jan. 30, 2007).
"Quickstart: Screen orientation for Windows Phone", Published on: Apr. 22, 2013, Available at: http://msdn.microsoft.com/en-us/library/windowsphone/develop/jj207002(v=vs.105).aspx, 6 pages.

(Continued)

*Primary Examiner* — Omar Abdul-Ali
(74) *Attorney, Agent, or Firm* — Tom Wong; Jessica Meyers; Micky Minhas

(57) ABSTRACT

Embodiments provide UI coalescing features that can be used in part to compensate for changes in device configurations, but the embodiments are not so limited. In an embodiment, a computer-based method operates to use UI coalescing features to adjust ribbon and/or popover controls to account for different device configurations. A handheld device of an embodiment can include one or more applications configured with UI coalescing heuristics that operate to dynamically adjust one or more ribbon controls and/or one or more popover controls based in part on a device configuration. Computer storage of an embodiment includes executable instructions that operate to dynamically adjust aspects of an application UI based in part on ribbon and popover control priority values. Other embodiments are included.

20 Claims, 13 Drawing Sheets

(56) References Cited

OTHER PUBLICATIONS

"User Experience Guidelines", Retrieved on: Apr. 24, 2013, Available at: http://developer.apple.com/library/ios/#documentation/userexperience/conceptual/mobilehig/UEBestPractices/UEBestPractices.html, 27 pages.

"Supporting Multiple Screens", Published on: May 14, 2011, Available at: http://developer.android.com/guide/practices/screens_support.html, 16 pages.

Northway, Sarah, "Supporting the Multiple Screen Sizes of Multiple Devices in Adobe Air", Published on: Jun. 11, 2012, Available at: http://www.adobe.com/devnet/air/articles/multiple-screen-sizes.html, 7 pages.

"Kindle Fire User Experience Guidelines", Published on: Oct. 25, 2012, Available at: https://developer.amazon.com/sdk/fire/cx-guidelines.html, 9 pages.

Neuburg, Matt, "Chapter 22. Popovers and Split Views", In Book—Programming iOS 6, 3rd Edition, Feb. 2013, 14 pages.

"UIPopoverController Class Reference", Retrieved on: Apr. 25, 2013, Available at: http://developer.apple.com/library/ios/#documentation/uikit/reference/UIPopoverController_class/Reference/Reference.html, 11 pages.

Kuhn, Peter, "Screen Orientations in Windows Phone 7", Published on: Aug. 16, 2011, Available at: http://www.silverlightshow.net/items/Screen-Orientations-in-Windows-Phone-7.aspx, 7 pages.

"Second Written Opinion Issued in PCT Application No. PCT/US2014/041003", Mailed Date: May 8, 2015, 12 Pages.

"Microsoft Word 2007, Screenshots of Ribbons and Popovers in 'Restore' and 'Maximize' Window Sizes". Jan. 30, 2007, pp. 1-4.

"International Preliminary Report on Patentability Issued in PCT Patent Application No. PCT/US2014/041003", Mailed date: Oct. 1, 2015, 13 pages.

\* cited by examiner

|  | Control A (RGPV, PGPV, ICV) | Control B (RGPV, PGPV, ICV) | Control C (RGPV, PGPV, ICV) | Control D (RGPV, PGPV, ICV) | ... |
|---|---|---|---|---|---|
| Application 1 202 | | | | | |
| Device Config. 1 | 1, 0, 2 | 1, 0, 3 | 0, 1, 4 | 0, 1, 4 | |
| Device Config. 2 | 0, 1, 2 | 0, 1, 3 | 1, 0, 4 | 1, 0, 4 | |
| Device Config. 3 | 0, 0, 0 | 0, 0, 0 | 0, 0, 0 | 0, 0, 0 | |
| Device Config. 4 | 2, 0, 4 | 3, 0, 5 | 0, 3, 6 | 0, 3, 5 | |
| Etc. | | | | | |
| Application N 206 | | | | | |
| Device Config. 1 | 0, 0, 0 | 0, 0, 0 | 1, 0, 1 | 1, 0, 3 | |
| Device Config. 2 | 0, 0, 0 | 0, 0, 0 | 0, 1, 1 | 0, 1, 3 | |
| Device Config. 3 | 0, 0, 0 | 0, 0, 0 | 0, 0, 0 | 0, 0, 0 | |
| Device Config. 4 | 0, 0, 0 | 0, 0, 0 | 2, 0, 2 | 3, 0, 3 | |

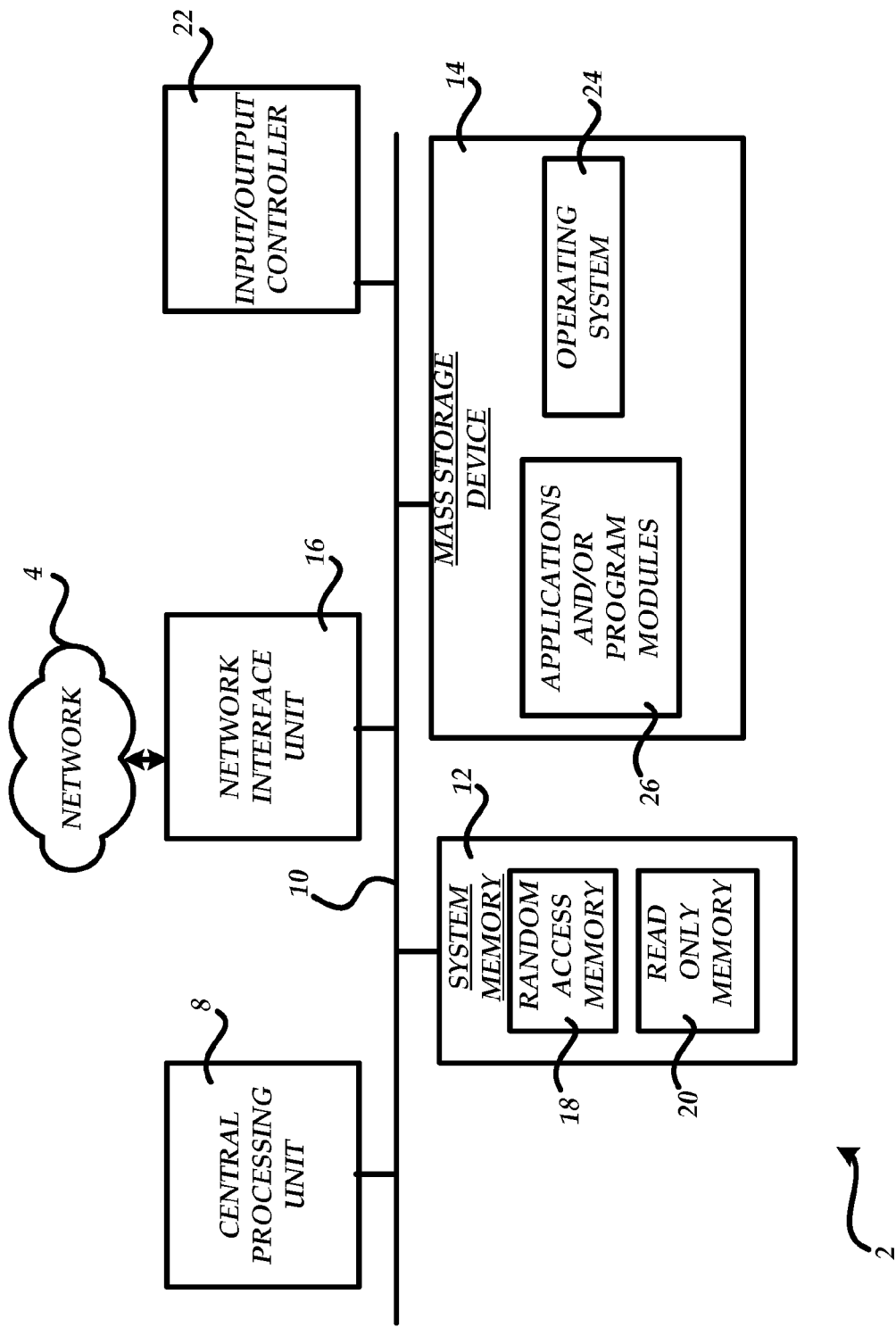

USER INTERFACE COALESCING HEURISTICS

BACKGROUND

Due in part to the numerous handheld computing devices available today, application developers need now take into consideration the wide variety of device configurations, such as screen or display sizes, orientations, resolutions, etc. when developing user interfaces (UIs) for various applications. In order to provide intuitive and rich user interfaces, an application developer also may need to account for various potential device configurations so as not to create a cluttered or unwieldy UI. Moreover, the developer also has to take into account the reduced amount of display or screen space available to display useable application controls.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide UI coalescing features that can be used in part to compensate for changes in device configurations, but the embodiments are not so limited. In an embodiment, a computer-based method operates to use UI coalescing features to adjust ribbon and/or popover controls to account for different device configurations. A handheld device of an embodiment can include one or more applications configured with UI coalescing heuristics that operate to dynamically adjust one or more ribbon controls and/or one or more popover controls based in part on a device configuration. Computer storage of an embodiment includes executable instructions that operate to dynamically adjust aspects of an application UI based in part on ribbon and popover control priority values. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 2 is a table that illustrates a number of exemplary control priority values for use with coalescing heuristics when displaying ribbon and/or popover controls.

FIG. 6 is a block diagram illustrating an exemplary computing environment for implementation of various embodiments.

DETAILED DESCRIPTION

Figure 1:
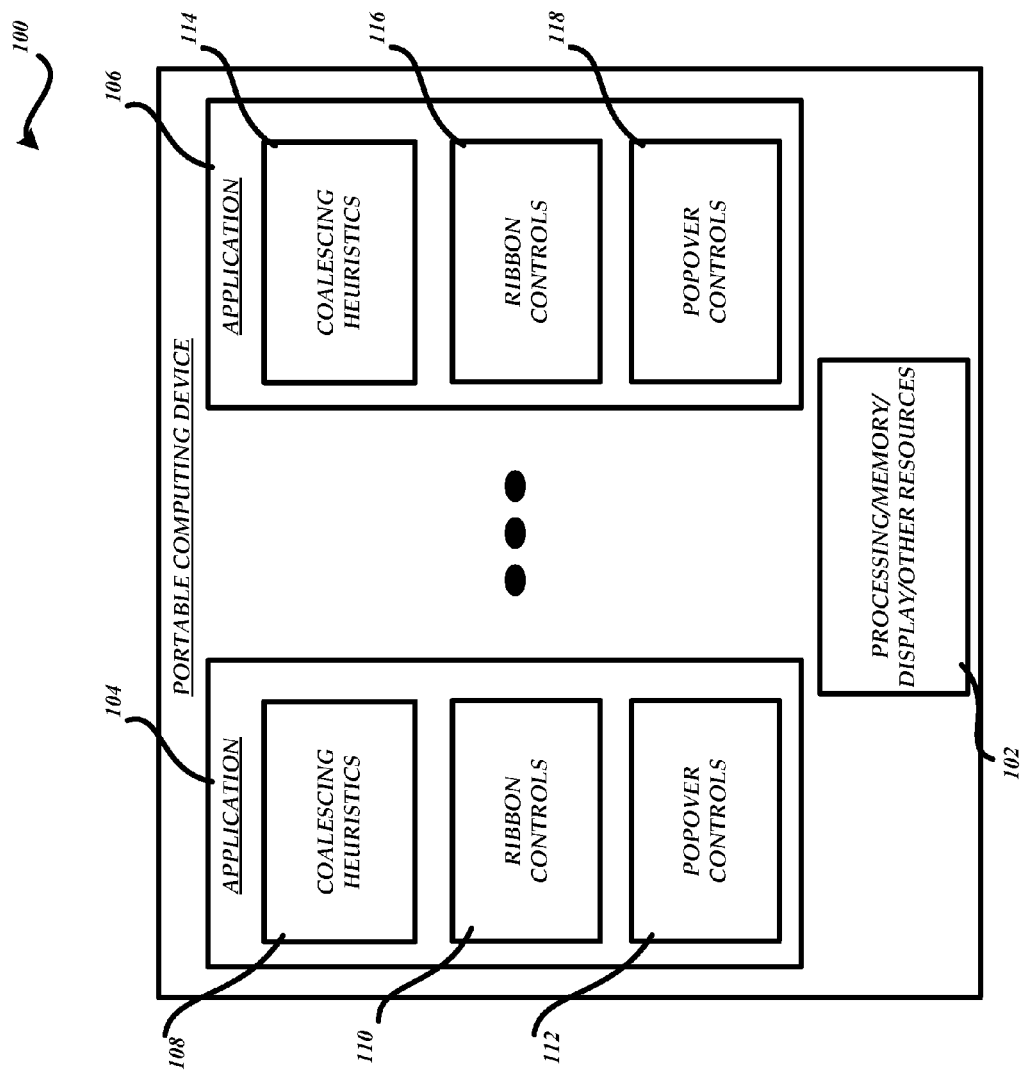
FIG. 1 is a block diagram of an exemplary portable computing device configured with user interface (UI) coalescing heuristics.

FIG. 1 is a block diagram of an exemplary portable or handheld computing device 100, such as a laptop, tablet, mobile or smart phone, and the like, configured with user interface (UI) coalescing heuristics that operate to dynamically respond to changes in device configurations, such as display, orientations, resolution, window resizing, etc. For example, one or more applications can be configured with UI coalescing heuristics that operate to dynamically control the display of application controls via a ribbon interface and/or a popover or secondary interface, wherein the coalescing heuristics operate to group and/or order ribbon controls and/or popover controls to reflect priority or some other factor.

As described below, UI coalescing heuristics can be functionally implemented with a wide range of applications, operating systems, and device/system types to provide a mechanism that adjusts application controls in response to device configuration changes. The UI coalescing heuristics of an embodiment can operate to effectively manage display of ribbon and/or popover controls based in part on one or more of ribbon group priorities, popover group priorities, and/or individual control priorities. The description with respect to FIG. 1 provides an overview of the UI coalescing functionality and is not intended to limit the claims listed below.

It will be appreciated that users now have many different types of applications available to use with their handheld devices and the coalescing heuristics can be utilized with certain applications to account and compensate for device changes when displaying an application UI. The overall capabilities and operational characteristics of each device/system, such as processor, memory, and display functionalities for example, can be accounted for and used when defining ribbon and/or popover controls and configurations as part of coalescing views as a user maneuvers or otherwise interacts with a device.

As shown in FIG. 1, the exemplary handheld computing device 100 includes processing, memory, display, and/or other resources (collectively represented as block 102) as well as a plurality of application types. For example, the handheld computing device 100 can be representative of tablet computer or smartphone that enables users to rotate the display through multiple orientations while using many different types of installed applications or "apps." As shown, the handheld computing device 100 includes a plurality of applications including first application 104 and an $n^{th}$ application 106. The ellipses are shown to illustrate the multiple applications available to the user of the handheld computing device 100.

Depending on the implementation, select ones of the applications may be configured with coalescing heuristics to compensate for device changes. For this example, application 104 includes coalescing heuristics 108 that operate to render one or more ribbon controls 110 and/or one or more popover controls 112 in an application UI as part of responding to user inputs and/or device manipulations. Likewise, a different application, application 106 includes coalescing heuristics 114 that operate to render one or more ribbon controls 116 and/or one or more popover controls 118 in a corresponding application UI. It will be appreciated that, depending on the device and/or user, the handheld computing device 100 can include tens if not hundreds of applications and the coalescing heuristics can be implemented as part of an application's functionality to compensate for changes of a device configuration when displaying ribbon and/or popover controls.

Coalescing heuristics of an embodiment can be configured as executable instructions or code that operates to respond to user actions including dynamically displaying ribbon and/or popover controls to compensate for viewing and/or other device changes. In one embodiment, the coalescing heuristics refer to defined ribbon and/or popover control priority values as part of dynamically displaying groupings and orderings of ribbon commands as well as providing reactionary or triggered popover displays that can be dynamically populated with groupings and orderings of popover commands according to device orientation, display resolution, display or window size, and the like.

The coalescing heuristics 108 can be used to dynamically adjust display of one or more of the ribbon controls 110 and/or one or more of the popover controls 112 while a user interacts with application 104 and/or manipulates aspects of the device, such as a device orientation, screen resolution, or some other operation which may affect a viewing area available to the end-user. The coalescing heuristics 108 of an embodiment are defined by complex programming code that operates to manipulate ribbon controls and/or popover controls as part of compensating for changes in the device characteristics when displaying an application UI associated with application 104.

As one example, a first set of ribbon controls and/or groupings can be displayed in a ribbon area while in a landscape view while a second set of ribbon controls and/or groupings can be displayed in the ribbon area while in a portrait view. As described below, spillover logic can be used to spillover controls that were previously displayed in the ribbon to a popover interface. Depending in part on the device, the coalescing heuristics 108 can use received touch, gesture, and/or other user inputs to provide appropriate UI coalescing responses.

The coalescing heuristics 108 of one embodiment use ribbon control priority values, including group and/or individual priority values (see Table of FIG. 2 for example), to determine what ribbon controls to display as the user interacts with the application 104 and manipulates the device. Ribbon controls 110 can include many numbers of user controls, wherein one or more of the ribbon controls 110 can be grouped together as part of a control grouping and/or ordering.

In one embodiment, the group priority values can be used to determine which ribbon control groups are shown or hidden and the individual control priority values can be used for further refining to determine which individual controls are shown or hidden whether included as a ribbon group or displayed individually. For example, when a user rotates the handheld computing device 100 to a portrait view there is less horizontal display area to use and the coalescing heuristics 108 can refer to group and/or individual priority values to determine which ribbon controls to display and/or hide.

As described further below, one or more of the popover controls 112 can be displayed as part of a popover interface in response to a user action. According to an embodiment, a ribbon control can be configured as a popover trigger such that a popover surfaces when the ribbon control is actuated or otherwise affected (e.g., tapped, clicked, hovered over, etc.). In response to a user actuation of a popover trigger, program code associated with the coalescing heuristics 108 executes to display an associated popover interface including a grouped ordering of popover controls for the application 104.

Once triggered, the coalescing heuristics 108 operate to determine which controls to populate in the popover interface. As one example, as a display orientation or resolution changes, the coalescing heuristics 108 can refer to group-based and/or individual control priority values when determining which controls to display in a ribbon and/or be included in a popover when triggered. For example, a popover interface may include different popover controls when displayed in a portrait view as compared with a landscape view as a result of one or more ribbon controls spilling over to populate the popover interface rather than the ribbon while in or orienting to the portrait view.

As such, the coalescing heuristics 108 operate in part to optimize the amount of display area when rendering ribbon and/or popover controls. According to each particular implementation, each application may be configured with duplicative controls that are displayed in a ribbon display as well as part of a popover display. Popovers can be dismissed or removed from display in a variety of ways, such as after receiving no input after a certain amount of time has elapsed, tapping the popover trigger a second time, changing focus, etc. Moreover, each ribbon may include multiple popover triggers that function to display distinct popover interfaces when triggered.

Actuation of a popover trigger of one embodiment operates to display popover controls and/or ordered popover control groups as defined by the group and/or individual priority values. The coalescing heuristics 108 can include the use of defined ribbon and/or popover priority values or other information as part of dynamically rendering groupings and orderings of ribbon and/or popover controls or commands according to device orientation, display resolution, display or window size, etc. Accordingly, the coalescing heuristics 108 are also used to determine which popover controls are to be displayed in each popover interface associated with application 104. It will be appreciated that the priority values and/or other parameters can be configured according to each particular application type and/or device type, including available viewing configurations and/or settings that may encompass different orientations, resolutions, screen or window sizes, etc.

The client devices/systems described herein can be configured with at least one processor, system memory, networking, display, and/or other components. System memory can include volatile (e.g. random access memory (RAM)), non-volatile (e.g. read-only memory (ROM)), flash memory, etc. System memory can include an operating system and various application programs that can be used by an end-user. It will be appreciated that embodiments described herein may also be practiced in conjunction with other operating systems, device/system types, and/or other application programs.

Various embodiments can be used with a number of computer configurations, including hand-held devices, multiprocessor systems, microprocessor-based or programmable consumer electronics, minicomputers, mainframe computers, etc. Various embodiments can be implemented in distributed computing environments using remote processing devices/systems that communicate over a one or more communications networks. In a distributed computing environment, program modules or code may be located in both local and remote memory. In a system-on-a-chip (SOC) architecture, a central processing unit, a graphics processor, memory, USB controller, power management circuits, wireless radio(s) (WiFi, cellular, etc.), and/or other components can be used to provide application functionality.

FIG. 2 is a table 200 that illustrates a number of exemplary control priority values for use with coalescing heuristics when displaying ribbon and/or popover controls or tools. Depending on the implementation, priority values can be defined such that various ribbon controls can be prioritized for display over other ribbon controls and various popover controls can be prioritized for display over other popover controls and/or control groups. As shown in the table 200, and according to an embodiment, each control is associated with one or more of a ribbon group priority value, a popover group priority value, and/or an individual priority value.

As described above, the priority values can be used when determining which controls to display in a ribbon interface and/or a popover interface. The priority values can be used in conjunction with coalescing heuristics to dynamically display ribbon and/or popover controls in response to user actions and/or inputs. For example, UI coalescing heuristics can use ribbon and popover control priority values to dynamically display ribbon and popover controls as a display or screen orientation or resolution changes (see FIGS. 3A-3F).

As shown for the example table of FIG. 2, each application includes different types of controls, wherein each control is assigned one or more of a ribbon group priority value (shown as "RGPV") and a popover group priority value (shown as "PGPV"), and an individual control priority value (shown as "ICPV"). For example, depending on the number of applications that use UI coalescing heuristics, values can be populated in the table 200 to reflect different control group and individual control priority values for various device configurations.

For the example of table 200, application 202 and application 206 include various controls selected from the multiple example controls, collectively referred to as controls 204, along with exemplary priority values. It will be appreciated that each application may have unique controls which can be added to the table or separated out. For this example, the value of zero is used to hide a control and lower priority values reflect higher priority display items. Thus, a control having a priority value of 2 will be prioritized for display before a control having a value greater than 2. Likewise, a control group having a higher display priority will be shown before a different control group having a lower display priority.

In one implementation, a higher priority value corresponds with a lower display priority. For example, a priority value of a ribbon control can be used when determining whether to display the ribbon control in the ribbon or spillover the ribbon control into a popover. The popover group and individual priority values can then be used to determine whether the spilled over control is to be grouped within a group of popover controls as well as the position within the ordered popover controls. Group priority values can be used in determining which control groups to display or hide as well as to identify which controls belong to which groups.

The ellipses reflect the fact that table 200 can be tailored for multiple applications and/or device configurations. Depending on the available device configurations, there may be any number of ribbon group priority values, popover group priority values, and individual control priority values. In one embodiment, each control can also include an individual priority value for a ribbon and an individual priority value for a popover, wherein the individual priority values may be equal or different. It will be appreciated that the number of controls of a group and the number of groups to be displayed for each application may depend in part on each device's configuration and/or specifications.

For this example, each control has been assigned one or more of a ribbon group priority value, popover group priority, and an individual control priority value. In one embodiment, a priority value of zero can be used when a control is not to be displayed in the ribbon or popover, whereas a priority value of one can be used to persist a control in the ribbon or popover regardless of display orientation, resolution, size, and/or some other factor. For example, priority values may be used to group one type of control in a first grouping of ribbon controls and in a different grouping of controls in a popover.

As described above, the priority values can be used when determining whether to display, hide, and/or spillover a particular control or group. For example, one type of control may be shown in the ribbon while in a landscape view but not shown in the ribbon when in a portrait view. Likewise, a popover control may not be included in a popover when in the landscape view but will be included in a popover when in the portrait view. The individual priority values can be used as part of determining a group ordering of individual controls as well determining when to show or hide individual controls.

Figure 3A:
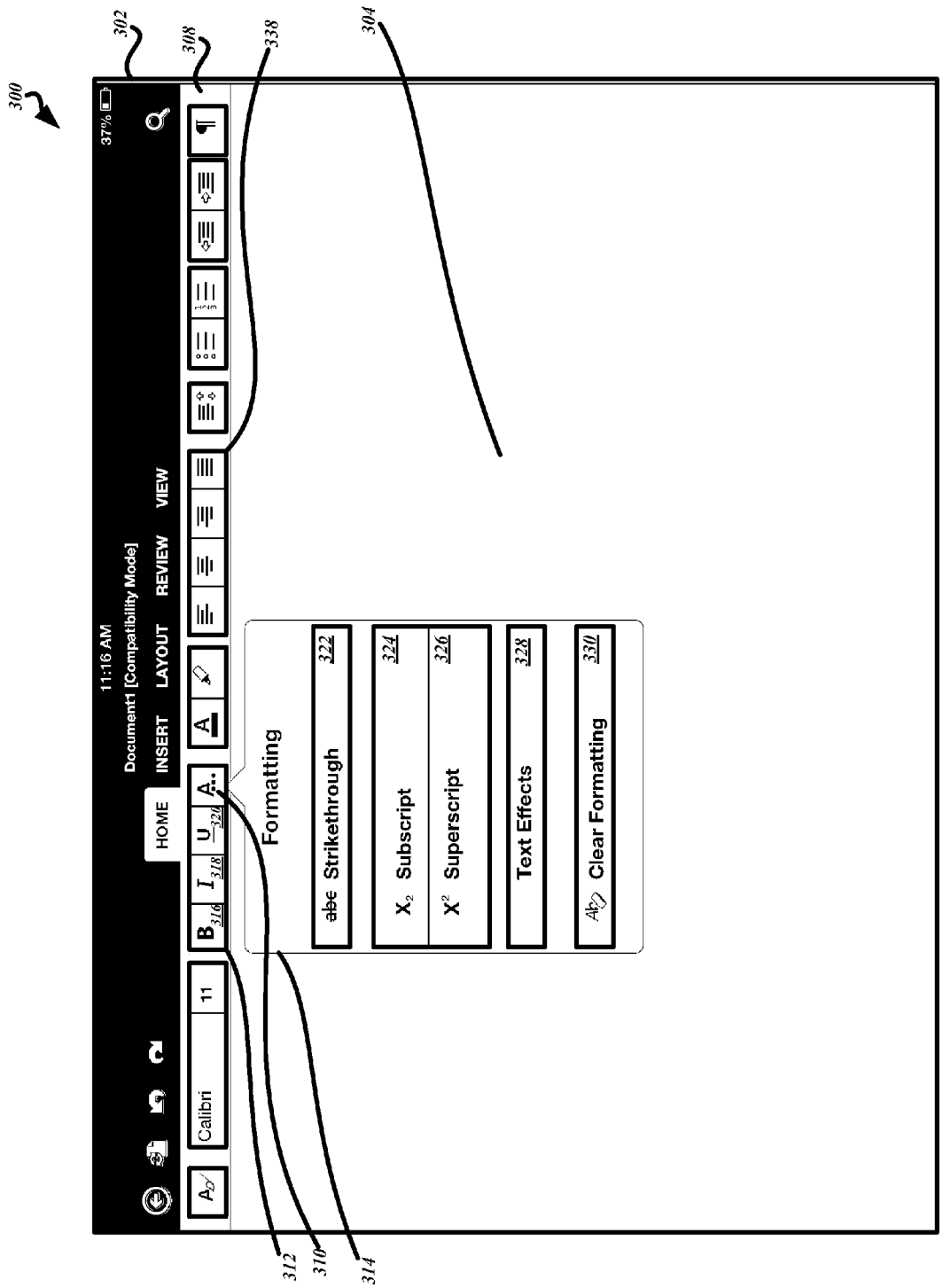
FIGS. 3A-3F depict implementation examples of an exemplary handheld computing device configured with coalescing heuristics.

FIGS. 3A-3F depict an exemplary handheld computing device 300, such as a tablet computer (e.g., SURFACE device) or smart phone (e.g., WINDOWS phone) for example, configured with UI coalescing heuristics that operate to account and/or compensate for one or more of display orientation, display resolution, and/or display size when displaying ribbon and/or popover controls for different application UIs. As shown in FIG. 3A, the handheld computing device 300 is currently oriented such that a horizontal screen dimension is larger than a vertical screen dimension of display, screen, or window 302, also referred to as a landscape display orientation or landscape view.

Those skilled in the art will appreciate that different mechanisms can be used to detect the device orientation, including accelerometer-based detection, camera-based detection, and/or other detection methods. In one embodiment, the handheld computing device 300 is configured to receive touch, gesture, and/or other user inputs as part of interacting with various applications running on the handheld computing device 300. The coalescing heuristics described herein can be used with many different application types and/or device/system types.

For this example, a user is using the handheld computing device 300 to run a word processing application to display an associated application UI 304 on screen 302. For the horizontal or landscape view, a control ribbon or ribbon 308 has been defined and referenced to include a number of ribbon controls or buttons being displayed on the screen 302. As described above, priority values associated with groups of ribbon controls and individual controls can be used to determine what is rendered in the ribbon 308. Ribbon controls of ribbon 308 are described in more detail below.

The application UI 304 is configured with code that responds to user input with one or more popover triggers to launch a secondary control interface, also referred to as a popover interface or control overlay. With continuing reference to FIG. 3A, program code executes to display a popover interface 314 in response to actuation of a popover trigger 310 associated with a group 312 of text-based controls. As described above, the group 312 of an embodiment is assigned a ribbon priority value used when determining whether to render or not render the group 312.

The coalescing heuristics of an embodiment can be tailored for each application according to one or more of screen size, screen resolution, screen orientation, and/or some other device parameter (see FIG. 2 for example) to dynamically render ribbon controls and groupings for the ribbon 308 as well as popover controls to be displayed in each popover interface in response to actuation of an associated popover trigger. For example, as a display orientation or resolution changes, the coalescing heuristics can refer to group-based and/or individual control priority values when determining which controls to display in the ribbon 308 and/or controls to be included in a popover or secondary control interface, such as popover interface 314. The secondary or popover interface 314 is shown after a user interacts with an associated popover trigger, trigger 310 for this example.

In one embodiment, a popover interface, such as the popover interface 314, is displayed on screen 302 in response to a user input, such as when a user touches, hovers, or otherwise interacts with a corresponding popover trigger. Depending on the particular implementation, each ribbon may include multiple popover triggers that function to display distinct popover interfaces when triggered or actuated. Actuation functionality can also be tailored to the expected or allowed input types (e.g., touch, voice, mouse, etc.). Accordingly, popover trigger 310 is functionally coupled with popover interface 314 such that actuation of the popover trigger 310 operates to display popover controls and popover control groups in the popover interface 314 as defined by the group and/or individual priority values. Accordingly, the coalescing heuristics can be used to determine which control items are to be displayed in or relegated to the popover interface 314.

It will be appreciated that overall device/system capabilities and operational characteristics, such as processor, memory, and display functionalities for example, can be accounted for and used when using defining ribbon and/or popover controls and configurations as part of coalescing potential views as a user maneuvers or otherwise interacts with the device. As described above, coalescing heuristics can include the use of defined ribbon and/or popover priority values or other information as part of dynamically rendering groupings and orderings of ribbon commands as well as providing reactionary or triggered popover displays that can be dynamically populated with groupings and orderings of popover commands according to device orientation, display resolution, display or window size, etc.

With continuing reference to the example of FIG. 3A, while in the landscape view, ribbon control priority values have been used to control which ribbon controls or buttons or other interactive controls, either individually and/or according to some grouping, are to be displayed in the ribbon 308 according to the current or predicted device configuration and/or settings. As shown, the first group 312 of text-based ribbon controls includes a grouped ordering including a ribbon control 316 or button to control text bolding operations, a ribbon control 318 to control text italicizing operations, a ribbon control 320 to control text underlining operations, and popover trigger 310 (also referred to as a "More" button) in the ribbon 308. For this example, popover trigger 310 is populated in group 312 but in other embodiments can be located or activated in a different manner.

The popover interface 314 of one embodiment is only shown after or in response to a user interaction with the popover trigger 310 (e.g., clicking, tapping, etc.). Depending on the implementations, popover trigger may be grouped with other controls or displayed individually. Thus, popovers of an embodiment are not exposed and remain hidden until a user explicitly interacts with or actuates a corresponding popover trigger. As described above, coalescing heuristics can also use spillover logic to dynamically add controls to a popover interface that were previously displayed in the ribbon 308.

For the example of FIG. 3A, in response to the user activating the popover trigger 310, coalescing heuristics code associated with the word processing application 302 operates to display popover controls of the popover interface 314 according to the landscape view. Some controls, referred to as static popover controls refer to controls that are displayed in a popover interface and not in the ribbon 308. As shown, the popover interface 314 includes a plurality of static popover controls, including popover control 322 for strikethrough operations, popover control 324 for subscript operations, popover control 326 for superscript operations, popover control 328 for text effects operations, and popover control 330 for clear formatting operations.

For this implementation, static popover controls 324 and 326 are set apart as a distinct popover control grouping as defined by the corresponding group and/or individual popover control priority values. For example, individual controls having the same group and/or individual priority values can be grouped together to form a popover control group. Each individual control or grouping can be set apart from others using separators or other distinguishing means according to each particular implementation. Correspondingly, the coalescing heuristics can rely on group and/or individual priority values in part to determine the display ordering and/or grouping of the popover controls in each popover interface for the particular screen orientation, resolution, etc. In one embodiment, certain controls are configured to be shown only inside a popover and/or not exposed in the ribbon 308 regardless of screen orientation, resolution, etc.

As described above, the coalescing heuristics can incorporate spillover logic to control when to remove a control item from the ribbon 308 and include the removed control item or a corresponding control in an associated popover interface. For example, coalescing heuristics can use the spillover logic to refer to an individual control item's priority value with respect to one or more other individual control item priority values to determine which control item of a group is to be removed from the ribbon 308 and added or spilled over to a popover interface associated with the group.

Figure 3B:
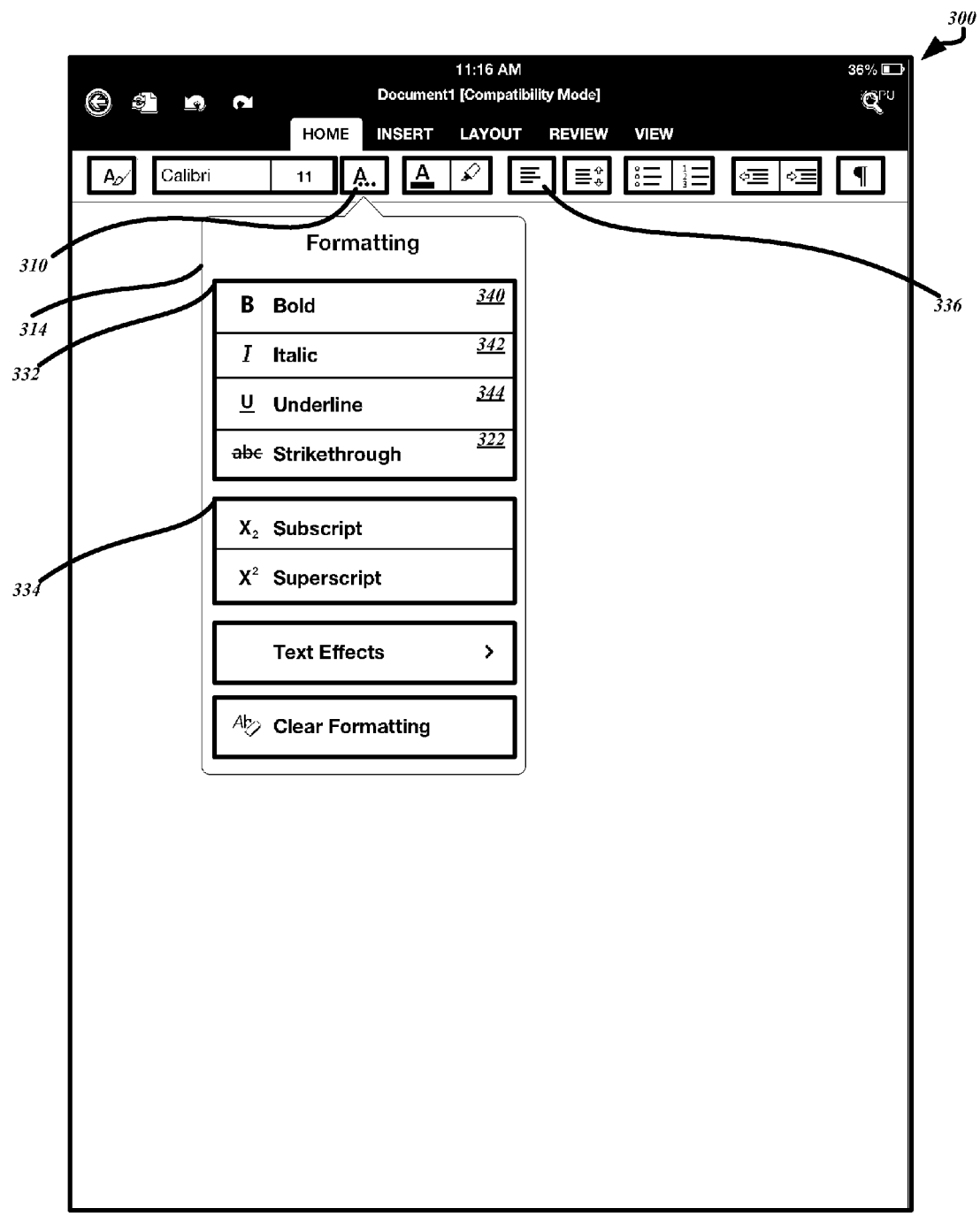

Referring now to FIG. 3B, the handheld computing device 300 is shown after being rotated to a second orientation such that a vertical screen dimension is larger than a horizontal screen dimension of screen 302, also referred to as a portrait display orientation or portrait view. The orientation has also affected the screen resolution which is accounted for by the coalescing heuristics. In similar fashion as described above, the coalescing heuristics are used in part in the controlled rendering of the application UI 304, including the display of one or more ribbon controls and/or popover controls, including dynamic additions/removals, orderings and/or groupings of controls or control items to be displayed when switching from the landscape view to the portrait view or some other view.

As shown in FIG. 3B, based on the changed view orientation, the ribbon 308 has been dynamically transformed using the coalescing heuristics and defined ribbon control priority values for the portrait view for the application UI 304. For this implementation example, the same application UI 304 when shown in portrait view includes a different set of ribbon controls in the ribbon 308 and the popover interface 314 accounting for the more limited amount of horizontal display area. Note that certain controls that were previously exposed in the ribbon 308 in FIG. 3A are now exposed in the popover interface 314 while in the portrait view and in response to activation of the popover trigger 310.

The coalescing heuristics associated with application UI 304 have been used to transform the ribbon controls as well as populate the popover interface 314 with popover controls according to an ordering that reflects priority and grouping. More particularly and for this example, the ribbon control 316 to control text bolding operations, ribbon control 318 to control text italicizing operations, and ribbon control 320 to control text underlining operations have been removed or hidden from the first group 312 of text-based ribbon controls leaving the popover trigger 310 in the ribbon 308.

For the portrait view and according to this implementation example, the removed controls are now exposed in the popover interface 314 as a group 332 of text-based popover controls. For the portrait view, and in response to a user using the popover trigger 310 to surface the popover interface 314, a popover group 332 of text-based controls includes the popover control 322 for strikethrough operations along with a newly added popover control 340 to control text bolding operations, newly added popover control 342 to control text italicizing operations, and newly added popover control 344 to control text underlining operations. The popover control 322 is rendered below the newly added popover controls reflecting a lower individual priority value.

The newly added popover controls used for the portrait view of the application UI 304 are ordered within the group 332 according to the individual priority values. Moreover, the user immediately recognizes the higher priority of group 332 as reflected by the positioning of the group 332 at the top of the popover interface 314. That is, group 332 is displayed above the subscript and superscript group 334 due in part to the priority level of group 332. For example, group 332 may have a priority value of one (1), whereas group 334 has a priority value of two (2) requiring display below group 332 in accordance with the popover group priority ordering for the popover interface 314 while in portrait view. In accordance with an embodiment, the one or more controls of group 334 are limited to being shown in popover interface 314 and not as part of the ribbon 308. Moreover, as described above, certain controls can be isolated to only display as part of a popover interface and not in the ribbon 308 due in part to not warranting a primary display position such as provided by the ribbon 308 or other front-facing location that does not require a user interaction to surface.

Not only have ribbon controls 316, 318, and 320 been hidden or removed from ribbon 308 to compensate for the orientation change for application UI 304; but ribbon control 336 that controls left formatting operations is the only formatting control remaining in the ribbon 308 from group 338 shown in FIG. 3A when oriented in the portrait view of FIG. 3B. For this implementation of the application UI 304, a popover trigger has not been configured to surface for the group 338 of formatting controls displayed in the ribbon 308 while in the portrait view.

As shown in FIG. 3B, the coalescing heuristics have operated in part to account for the reduced amount of display space and changed resolution associated with the rotating or manipulation of handheld computing device 300 in part by removing or hiding particular ribbon controls based in part on one or more of group and individual priority values. For example, the removed controls included priority values that reflected a lower display priority relative to ribbon control 336. It will be appreciated that the priority values can be configured according to each particular application type and/or device type, including available viewing configurations and/or settings that may encompass different orientations, resolutions, screen or window sizes, etc. It will also be appreciated that other ribbon and/or popover control groupings and/or orderings can be used according to particular UI coalescing heuristics and defined by way of corresponding priority values and/or some other criteria. In one embodiment, each application type can be configured to allow users to customize ribbon controls and/or popover controls using the coalescing heuristics and priority value settings for different device configurations and settings.

Figure 3C:
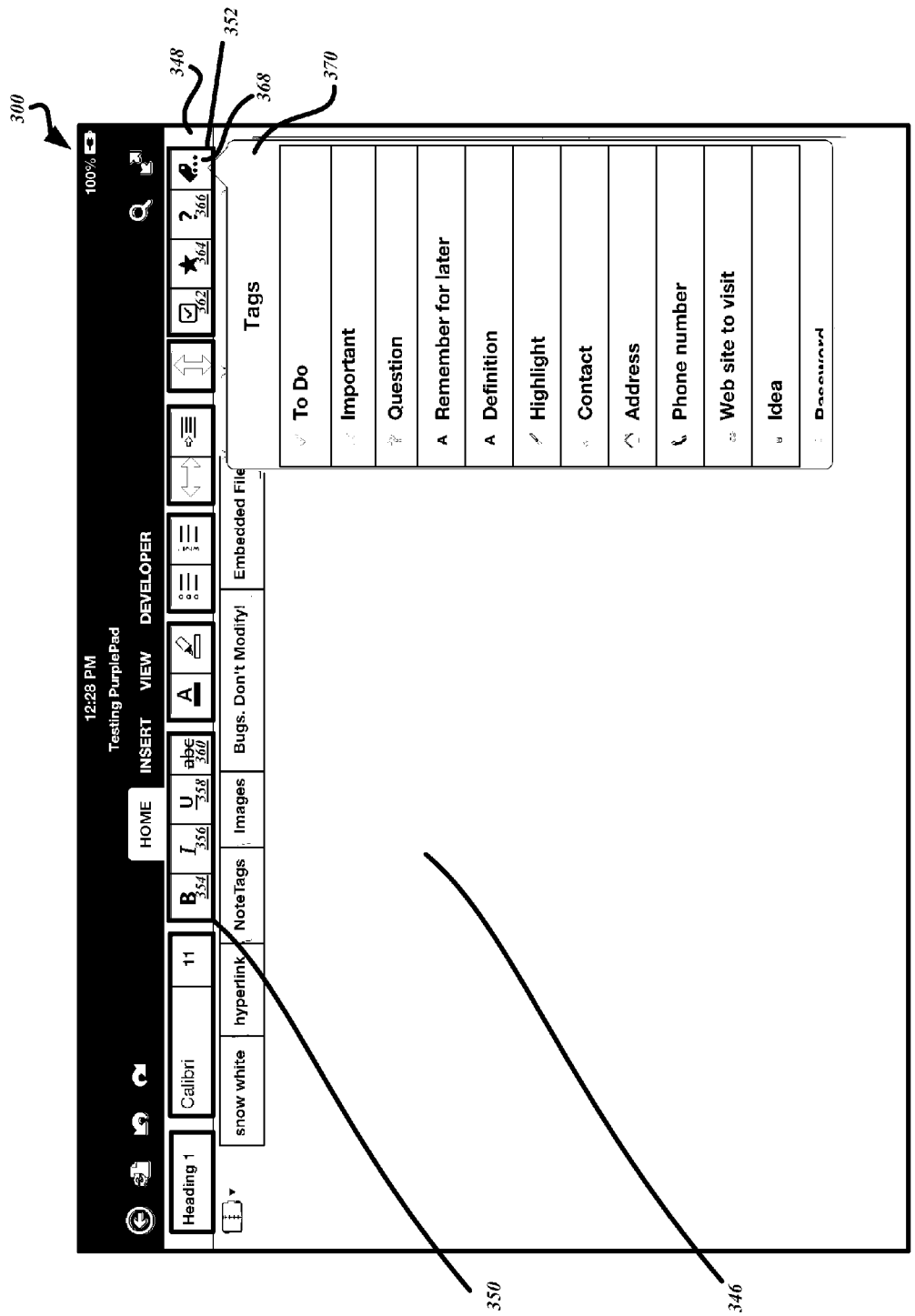
Figure 3D:
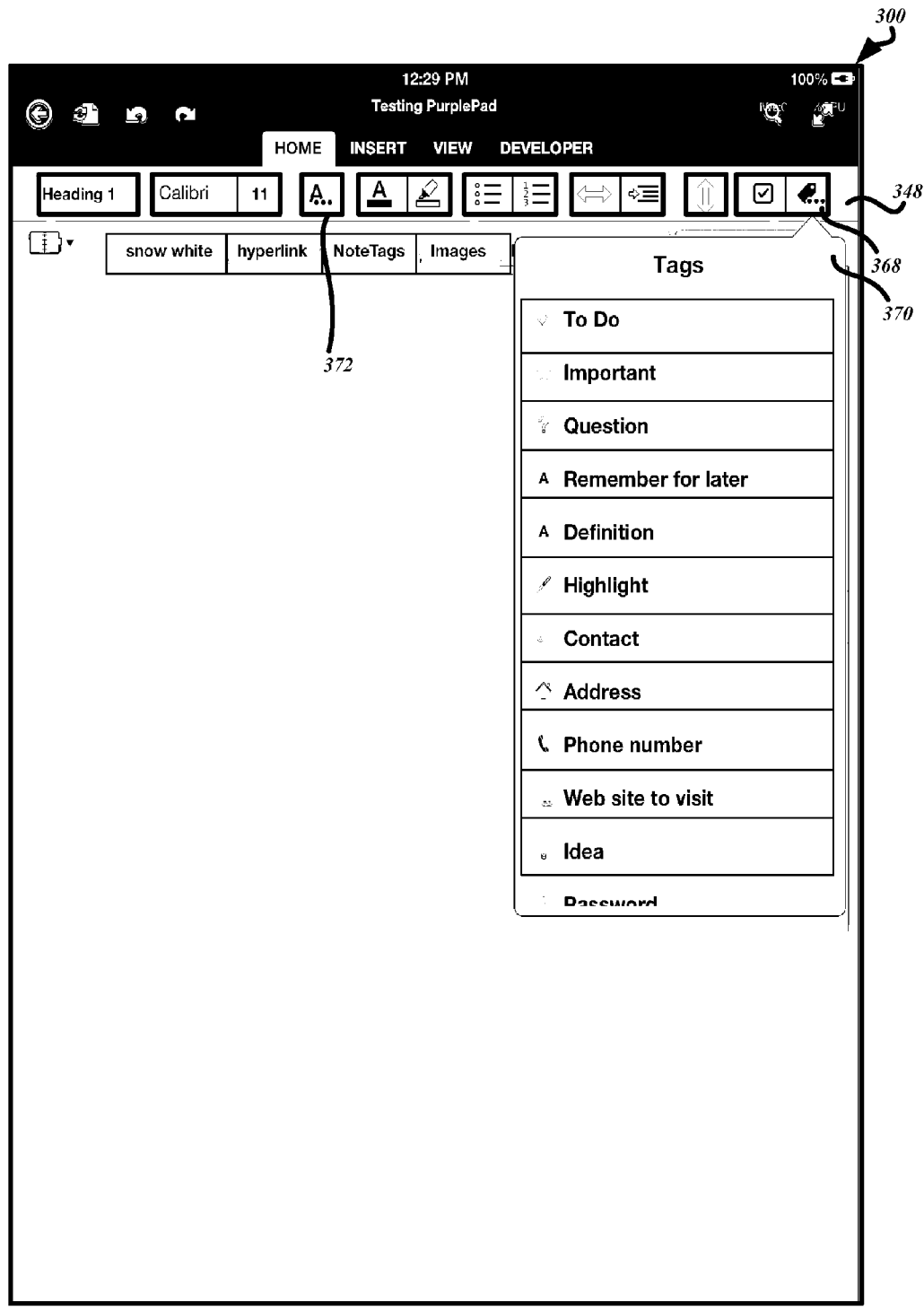

FIGS. 3C-3D depict the exemplary handheld computing device 300 while using UI coalescing heuristics for a different application UI 346, such as a notes application UI for example, to display a distinct set of ribbon and/or popover controls while in a landscape view as compared with a portrait view. It will be appreciated that users now have many different types of applications available to use with their handheld devices and the coalescing heuristics can be utilized with each particular application to account and compensate for changes in the device characteristics when displaying an application UI.

As shown in FIG. 3C, the handheld computing device 300 is currently oriented such that the application UI 346 is displayed in a landscape view and a first set of ribbon control are displayed in the ribbon 348. The application UI 346 can use received touch, gesture, and/or other user inputs and respond with appropriate responses. For the example implementation of FIG. 3C, a user is using the handheld computing device 300 to interact with the application UI 346 while in the landscape view. As shown in FIG. 3C, a ribbon 348 for the application UI 346 has been rendered and displayed to include a number of ribbon controls being displayed on the screen 302.

The ribbon 348 of the application UI 346 has been defined in part using ribbon control priority values to determine which ribbon controls are to be rendered in the ribbon 348 as the user interacts with the application UI 346 in the landscape view or some other view. As shown in FIG. 3C, the ribbon 348 includes a number of ribbon controls directed to functionality associated with the application UI 346. To illustrate use of coalescing heuristics for application UI 346 while in landscape view, a first group 350 of ribbon controls that includes text-based controls and second group 352 of ribbon controls that includes tagging controls are displayed.

The first group 350 of ribbon controls of the application UI 346 includes a grouped ordering including a ribbon control 354 to control text bolding operations, a ribbon control 356 to control text italicizing operations, a ribbon control 358 to control text underlining operations, and ribbon control 360 to control text strikethrough operations. Notice that for this implementation of application UI 346, a popover trigger is not displayed with the group 350 in the ribbon 348 while in the landscape view. The second group 352 of ribbon controls includes a grouped ordering including a ribbon control 362 to control a to-do type tag, a ribbon control 364 to control an important type tag, a ribbon control 366 to control a question type tag, and a popover trigger or more button 368 that can be actuated or otherwise interacted with to display a corresponding popover interface 370.

In response to a user actuation of a popover trigger 368, such as a tap, click or other interactive input, program code associated with coalescing heuristics for application UI 346 executes to display the popover interface 370 including a grouped ordering of popover controls associated with the notes application. As described above, coalescing heuristics can be tailored for each application to dynamically render one or more grouped and ordered controls for the ribbon 348 as well as popover controls to be displayed in each popover interface. For example, as a display orientation or resolution changes, the coalescing heuristics can refer to group-based and/or individual control priority values when determining which controls to display in the ribbon 348 and/or controls to be included in a popover when triggered. It will be realized that the popover interface 370 is shown after a user interacts with the popover trigger 368 for this example.

For this example, the popover interface 370 is populated with a variety of note-based tag type controls some of which are duplicates of the tag type controls displayed in the group 352. Accordingly and according to a particular implementation preference, each application UI can be configured such that certain controls can be displayed in ribbon control display areas as well as part of a popover interface display. Popovers can be dismissed or removed from display in a variety of ways, such as after a certain amount of idle time, tapping the popover trigger a second time, tapping another popover trigger, etc.

For this implementation example, the popover interface 370 has been displayed on screen 302 in response to a user input, such as a touch-based or some other input type, with popover trigger 368. Depending on the particular implementation, each ribbon may include multiple popover triggers that function to display distinct popover interfaces when triggered. Actuation of the popover trigger 368 operates to display popover controls and popover control groups in the popover interface 370 as defined by the group and/or individual priority values. Accordingly, the coalescing heuristics can be used to determine which control items are to be displayed in the popover interface 370. As described above, coalescing heuristics can include the use of defined ribbon and/or popover priority values or other information as part of dynamically rendering groupings and orderings of ribbon and popover commands according to device orientation, display resolution, display or window size, etc.

With continuing reference to the implementation example shown while in the landscape view of FIG. 3C, ribbon control group and/or individual priority values have been used to control how ribbon controls are to be displayed in the ribbon 370 according to the current or predicted device configuration and/or settings. As shown, the first group 350 of ribbon controls for application UI 346 includes a grouped ordering defined in part by the individual ribbon control priority values. The second group 352 also includes a grouped ordering defined in part by the individual ribbon control priority values, such that controls having a higher priority remain in the ribbon while lower priority controls are removed or hidden as the user manipulates the device 300 or application UI 346.

As described above, the coalescing heuristics can also use spillover logic to dynamically add or remove controls to the popover interface 370 according to an operational state of the handheld computing device 300. However, for this example, the popover interface 370 is populated with the same tagging controls when both landscape and portrait views. As described above, implemented coalescing heuristics can rely on group and/or individual priority values in part to determine display ordering and/or grouping of the popover controls.

Referring now to FIG. 3D, the handheld computing device 300 is shown after being rotated to a second orientation, a portrait view. The coalescing heuristics have been used in the controlled rendering of the application UI 346 for the changed view, including the collapsing and spilling over of all of the ribbon controls of group 350 into a popover trigger 372 as well as spilling over ribbon controls 364 and 366 into popover interface 370 that is actuated via popover trigger 368. The coalescing heuristics can be used to dynamically add, remove, order, and/or group ribbon and/or popover controls. A user could select the popover trigger 372 to reveal popover controls that correspond to the now hidden ribbon controls 354, 356, 358, and 360.

As shown in FIG. 3D, the popover interface 370 has been revealed in response to actuation of popover trigger 368. As another illustrative implementation example, the same application UI 346 when shown in portrait view includes a different set of ribbon controls as compared to the landscape view. Moreover, code associated with the coalescing heuristics has operated in part to account for the reduced amount of display space and changed resolution associated with the rotation of handheld computing device 300 in part by removing or hiding particular ribbon controls based in part on one or more of group and individual priority values. Again, it will be appreciated that the priority values can be configured according to each particular application type and/or device type, including available viewing configurations and/or settings that may encompass different orientations, resolutions, screen or window sizes, etc.

Figure 3E:
Figure 3F:
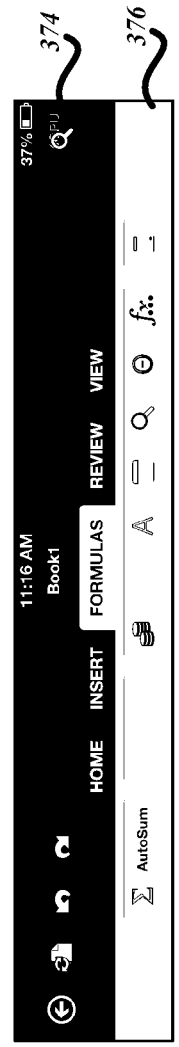

FIGS. 3E-3F depict a partial view depicting use UI coalescing heuristics for yet another application UI 374, such as a spreadsheet type application UI for example. Again, implemented coalescing heuristics have been utilized to compensate for changes in the device characteristics when displaying the application UI 374. This example illustrates how the coalescing heuristics can be further configured to remove text from the ribbon controls of the ribbon 376 to compensate for the reduced display area when rotating from the landscape view to the portrait view. Removal of the ribbon control text allows for use of more compact ribbon controls for display in the changed view. It will be appreciated that other embodiments and examples are included and the various UI coalescing heuristics can be further modified for each particular implementation.

Figure 4:
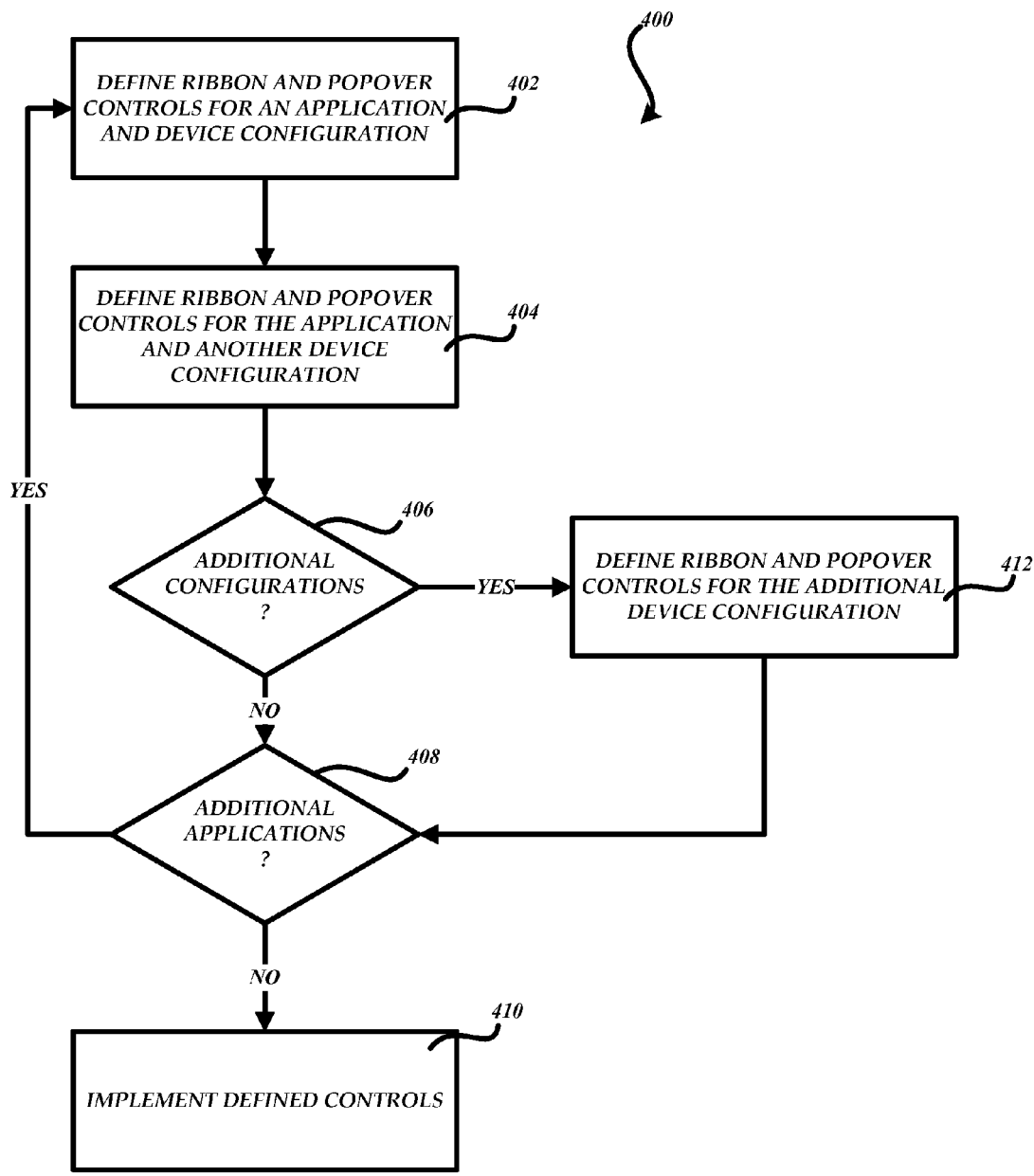
FIG. 4 is a flow diagram depicting an exemplary process of defining ribbon and popover controls.

FIG. 4 is a flow diagram depicting an exemplary process 400 of implementing a number of ribbon controls and/or popover interface controls for a number of applications, but is not so limited. At 402, the process 400 operates to define one or more ribbon and/or popover controls for a user application, wherein the defined controls for the user application are associated with a device configuration. For example, an application UI developer can define ribbon controls and control groups, popover controls and control groups, and/or priority values to be used when displaying certain controls and/or control groups while in portrait or first display configuration.

At 404, the process 400 operates to define one or more ribbon and/or popover controls for the same user application but for a different device configuration. For example, different ribbon controls and control groups, different popover controls and control groups, and/or priority values can be defined and used to dynamically display some of the same and/or different controls and/or control groups during or after transitioning to a landscape display configuration. If there are no additional device configurations at 406 or applications to consider at 408, the process 400 proceeds to 410 and the defined controls are implemented. For example, defined controls can be included as add-in code or included as functionality of an installed product or web-based product.

If there are additional device configurations to consider at 406, the process 400 proceeds to 412 and one or more ribbon and/or popover controls are defined for the same user application but with yet another device configuration. If there are no additional device configurations at 406 but there are additional applications to consider at 408, the process 400 proceeds to 412 and defines ribbon and/or popover controls for the different application and the process 400 continues as described above. While a certain number and order of operations is described for the exemplary flow of FIG. 4, it will be appreciated that other numbers and/or orders can be used according to desired implementations.

Figure 5:
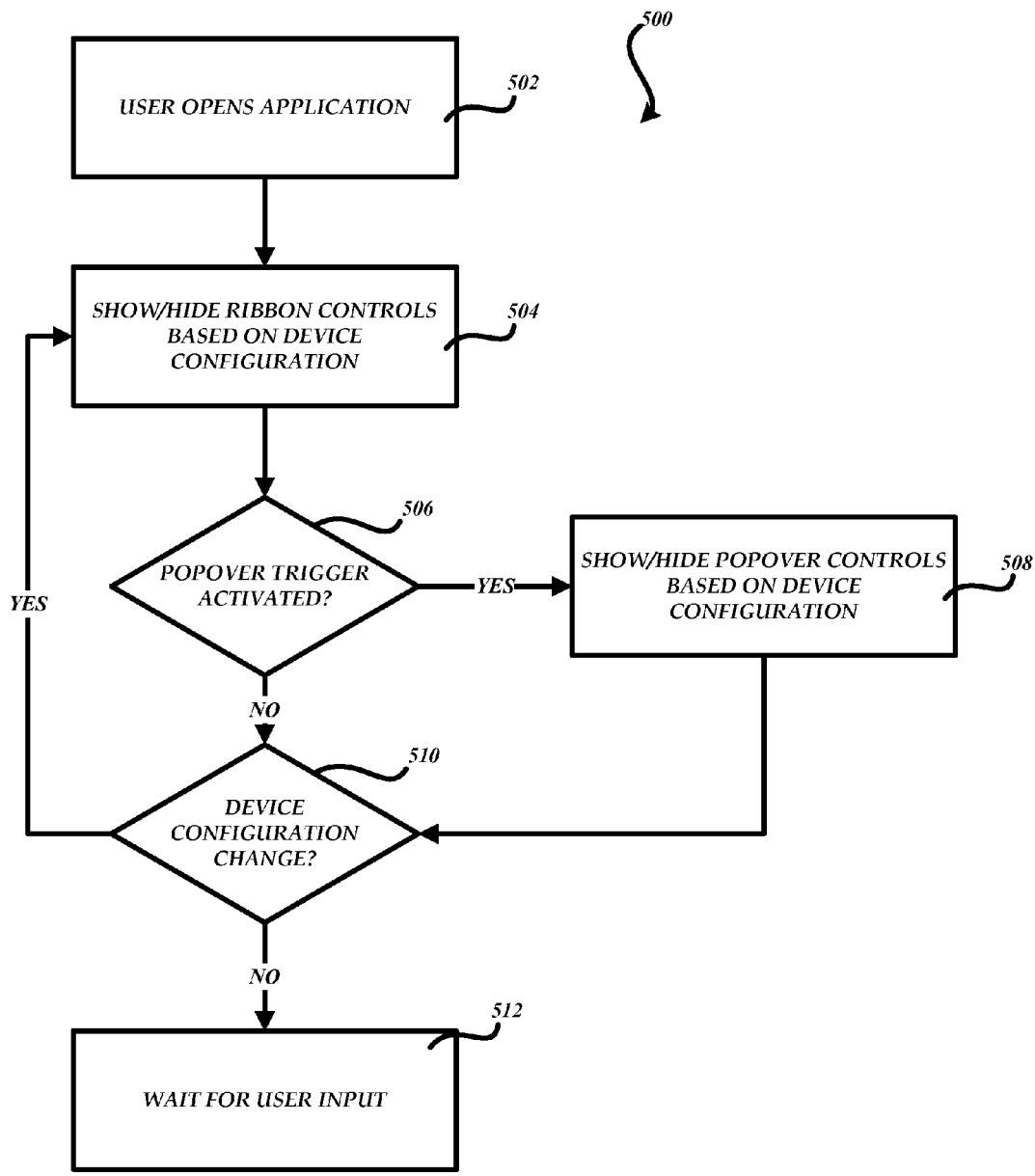
FIG. 5 is a flow diagram depicting an exemplary process of using coalescing heuristics to adaptively control display of ribbon controls and popover controls.

FIG. 5 is a flow diagram depicting an exemplary process 500 of using UI coalescing heuristics to adaptively control display of ribbon controls and popover controls. At 502, the process 500 begins when a user uses a computing device/system and an application equipped with UI coalescing heuristics. At 504, the process 500 operates to show and/or hide ribbon controls or commands based on the current device configuration. For example, the process 500 at 504 can use the coalescing heuristics to selectively display certain ribbon tools and/or tool groups while the user is holding the computing device in a landscape orientation.

At 506, the process 500 determines if a popover trigger has been activated. If a popover trigger has been activated at 506, the process 500 proceeds to 508 and shows and/or hides popover controls of an associated popover interface according to the current device configuration. If a popover trigger has not been activated at 506, the process 500 at 510 determines if the device configuration has changed. If the device configuration has changed at 510, the process 500 returns to 504 and continues as described above.

As an example, the process 500 at 510 may use accelerometer output to determine that a user rotated the device from a landscape orientation to a portrait orientation or an operating system output to determine resizing of a display window which has affected the amount of display area that may be require removal of one or more ribbon controls or groups. If the device configuration has not changed at 510, the process 500 proceeds to 512 and waits for user input. While a certain number and order of operations is described for the exemplary flow of FIG. 5, it will be appreciated that other numbers and/or orders can be used according to desired implementations.

It will be appreciated that various features described herein can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a process or method, including for example, systems comprised of processing units and arithmetic-logic circuits coupled to computer memory, which systems have the capability of storing in computer memory, which computer memory includes electronic circuits configured to store data and program instructions or code.

An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations. The term computer readable media as used herein can include computer storage media or computer storage. The computer storage of an embodiment stores program code or instructions that operate to perform some function. Computer storage and computer storage media can include volatile and nonvolatile, removable and non-removable media implemented in any method or technology for storage of information, such as computer readable instructions, data structures, program modules, etc.

System memory, removable storage, and non-removable storage are all computer storage media examples (i.e., memory storage.). Computer storage or computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Referring now to FIG. 6, the following discussion is intended to provide a brief, general description of a suitable computing environment in which embodiments may be implemented. While described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 6, computer 2 comprises a general purpose server, desktop, laptop, handheld, or other type of computer capable of executing one or more application programs including applications that use UI coalescing heuristics or other application functionality. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

Figure 7A:
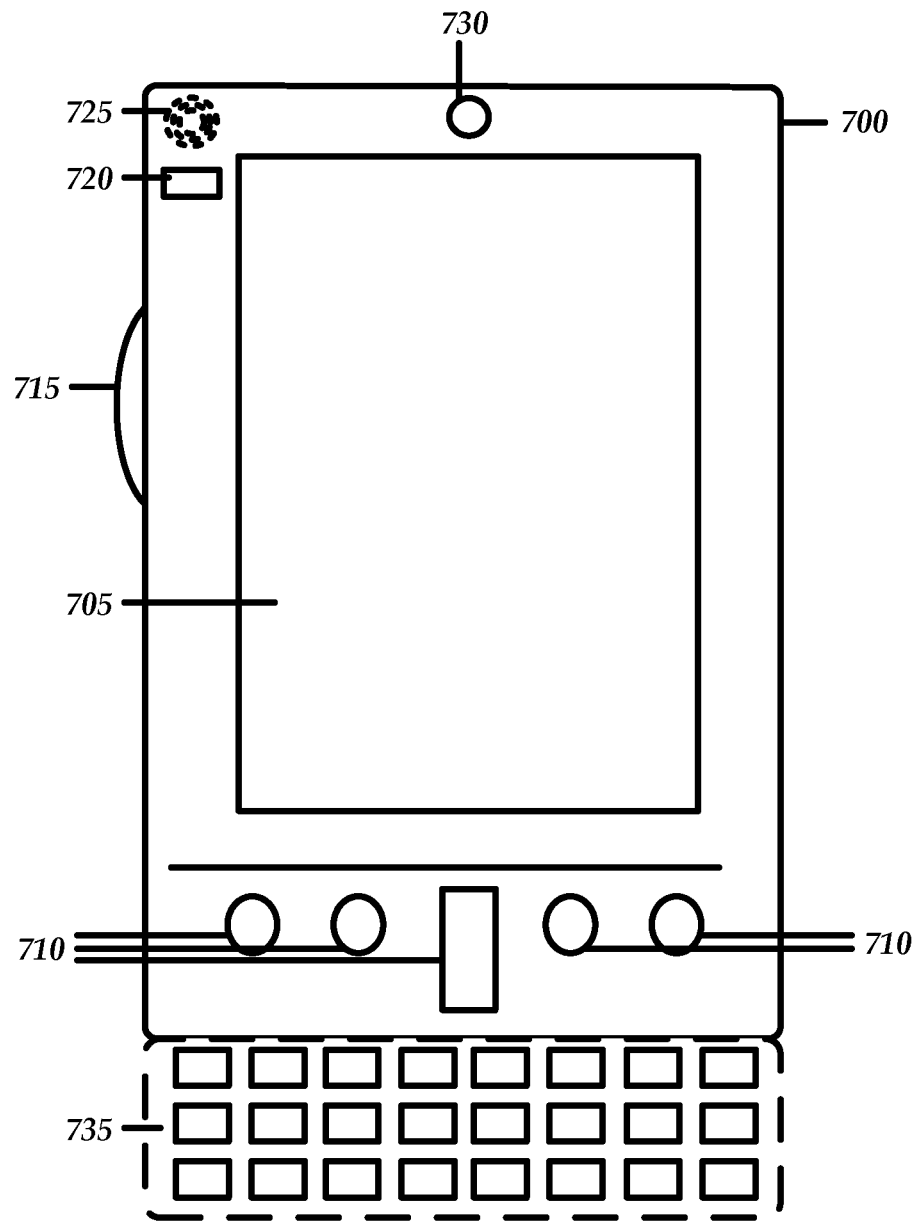
FIGS. 7A-7B illustrate a mobile computing device with which embodiments may be practiced.
Figure 7B:
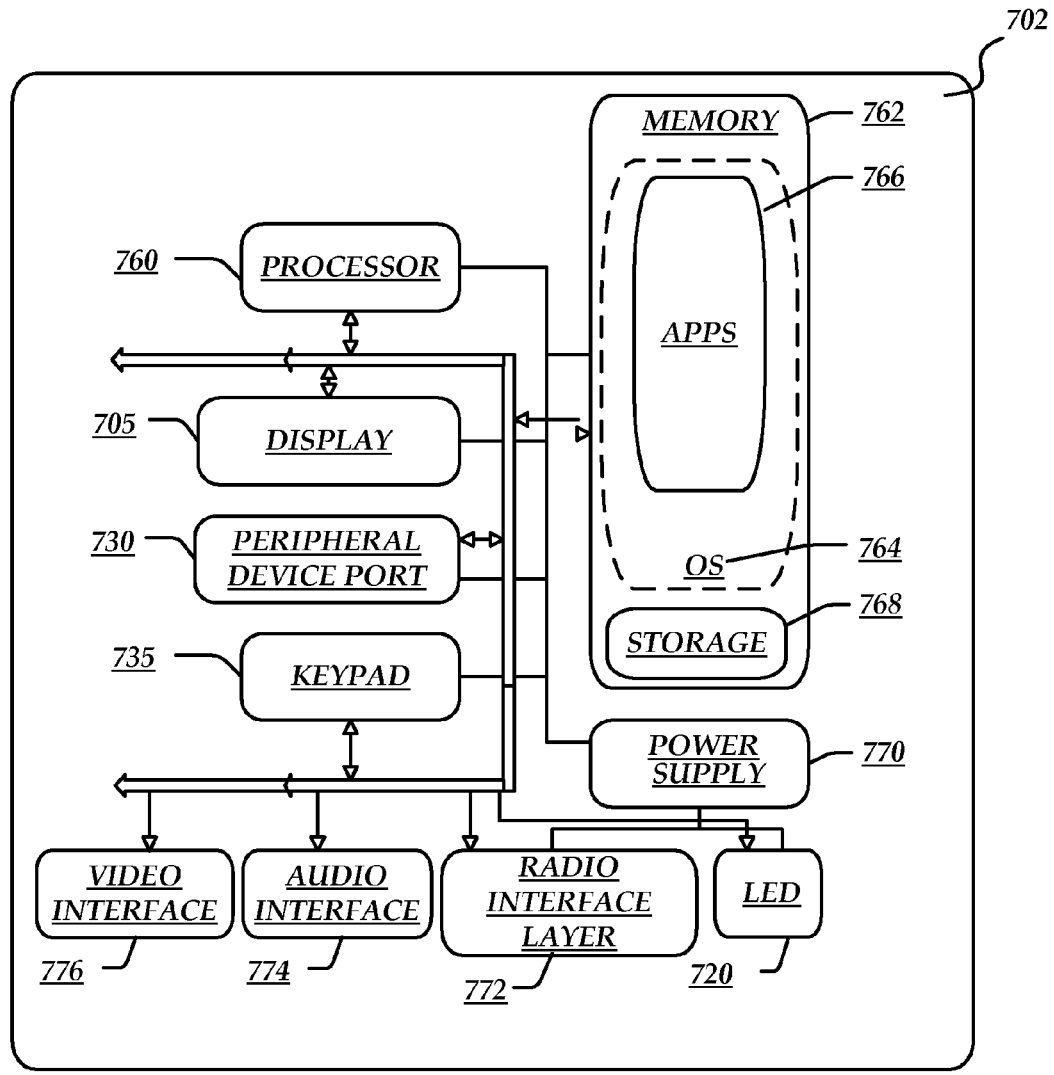

FIGS. 7A-7B illustrate a mobile computing device 700, for example, a mobile telephone, a smart phone, a tablet personal computer, a laptop computer, and the like, with which embodiments may be practiced. With reference to FIG. 7A, one embodiment of a mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766, including UI coalescing heuristics, may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries. The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device.

The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
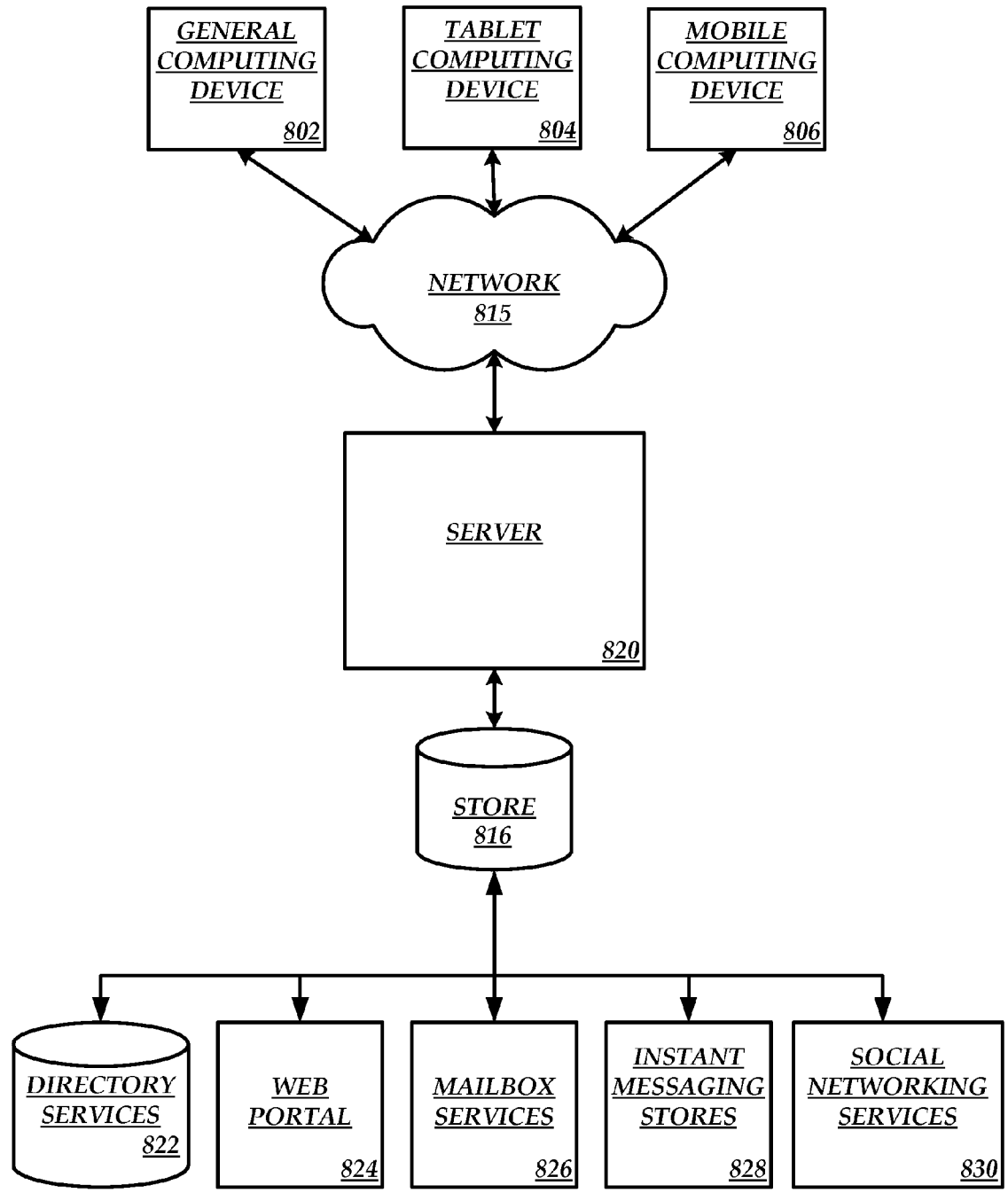
FIG. 8 illustrates one embodiment of the architecture of a system that includes one or more client devices.

FIG. 8 illustrates one embodiment of the architecture of a system that includes one or more client devices. Content may be stored in different communication channels or other storage types. For example, various information may be stored using a directory service 822, a web portal 824, a mailbox service 826, an instant messaging store 828, and/or a social networking site 830. As one example, the server 820 may be communicated with over network 815, such as the Internet or other network for example. By way of example, the client computing device may be implemented as a general computing device 802 and embodied in a personal computer, a tablet computing device 804, and/or a mobile computing device 806 (e.g., a smart phone). Any of these clients may use content from the store 816.

Embodiments of the invention, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

It should be appreciated that various embodiments can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   using a portable computing device to execute an application while in a first device configuration;
   displaying a first number of ribbon controls associated with the application while in the first device configuration;
   in response to a user input, displaying a first number of popover controls associated with the application while in the first device configuration;
   displaying a second number of ribbon controls associated with the application while in a second device configuration, wherein the second number of ribbon controls is determined based upon one or more coalescing heuristics and one or more control priority values; and
   in response to a user input, displaying a second number of popover controls associated with the application while in the second device configuration.

2. The method of claim 1, further comprising wherein the second number of ribbon controls is greater than the first number of ribbon controls.

3. The method of claim 1, further comprising wherein the second number of popover controls is greater than the first number of popover controls.

4. The method of claim 1, wherein the first and second device configurations correspond with first and second device orientations.

5. The method of claim 1, wherein the first and second device configurations correspond with first and second display resolutions.

6. The method of claim 1, wherein the first and second device configurations correspond with first and second window configurations.

7. The method of claim 1, further comprising displaying the first number of popover controls in response to activation of a popover trigger.

8. The method of claim 7, further comprising displaying the second number of popover controls in response to activation of the popover trigger.

9. The method of claim 1, further comprising using one or more ribbon group priority values, popover group priority values, and individual control priority values when determining which controls to display while in the first and second device configurations.

10. The method of claim 1, wherein the second number of popover controls include one or more controls from the first number of ribbon controls.

11. The method of claim 1, further comprising hiding the popover controls until the popover trigger is actuated.

12. The method of claim 1, further comprising using coalescing heuristics to dynamically display ribbon and popover controls for a second application type including application defined priority values.

13. A portable computing device comprising:
a processor and memory;
a number of applications; and
a display configured to:
  display a first number of ribbon controls associated with an application user interface (UI) while in a first device configuration;
  display a first number of popover controls associated with the application UI while in the first device configuration in response to actuation of a trigger;
  display a second number of ribbon controls associated with the application UI while in a second device configuration, wherein the second number of ribbon controls is determined based upon one or more coalescing heuristics and one or more control priority values; and
  display a second number of popover controls associated with the application UI while in the second device configuration in response to actuation of the trigger.

14. The device of claim 13, wherein the trigger comprises a ribbon control.

15. The device of claim 13, wherein the first device configuration comprises a portrait view and the second device configuration comprises a landscape view.

16. The device of claim 13, wherein UI coalescing heuristics are used to dynamically display varying ribbon control groups and varying popover control groups based on device configuration changes.

17. The device of claim 16, wherein the display is configured to display the varying ribbon control groups and varying popover control groups of the application UI after rotating the device from one orientation to another orientation.

18. A computer-readable storage device which stores instructions that, when executed by a processor, operate to:
use a first number of ribbon controls associated with an application UI while in a portrait view;
use a first number of popover controls associated with the application UI while in the portrait view in response to actuation of a popover trigger;
use a second number of ribbon controls associated with the application UI while in a landscape view, wherein the second number of ribbon controls is determined based upon one or more coalescing heuristics and one or more control priority values; and
use a second number of popover controls associated with the application UI while in the landscape view in response to actuation of the popover trigger.

19. The computer-readable storage device of claim 18, wherein the instructions operate further to use coalescing heuristics to selectively show and hide ribbon and popover controls according to each view.

20. The computer-readable storage device of claim 18, wherein the instructions operate further to manipulate ribbon controls and popover controls as part of compensating for changes in device characteristics when displaying the application UI.

* * * * *